Figure 1:
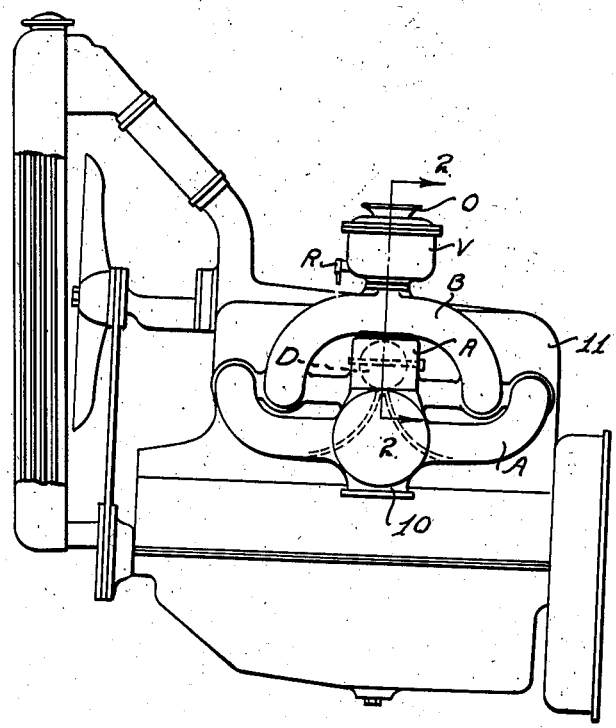

April 23, 1935. G. M. HOLLEY 1,998,581
THERMOSTATICALLY CONTROLLED PRIMER
Filed Feb. 4, 1932 2 Sheets-Sheet 1

INVENTOR.
GEORGE M. HOLLEY.
BY
ATTORNEY.

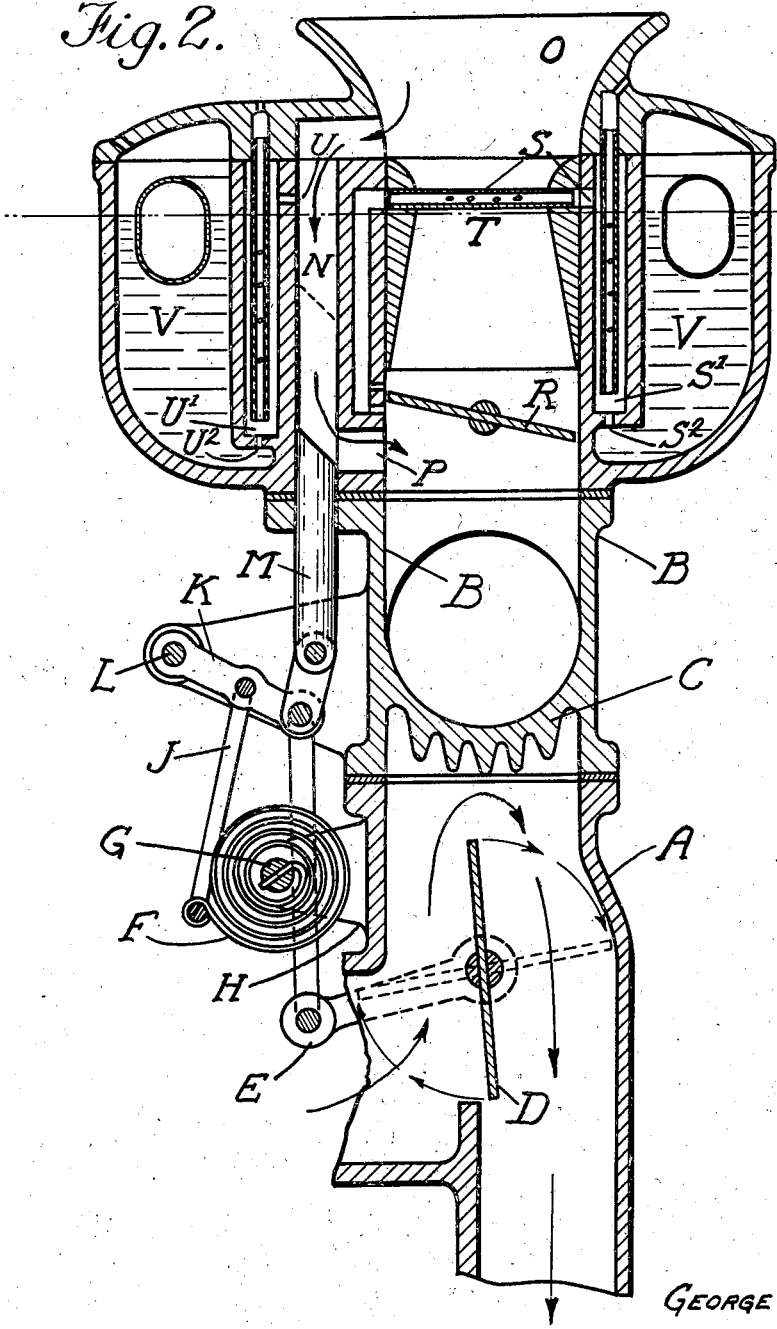

Patented Apr. 23, 1935

1,998,581

UNITED STATES PATENT OFFICE 1,998,581

THERMOSTATICALLY CONTROLLED PRIMER

George M. Holley, Detroit, Mich.

Application February 4, 1932, Serial No. 590,898

3 Claims. (Cl. 123—122)

This invention relates to a device for starting automobile engines without the use of a choke. The Figure 2 shows all the necessary elements of my invention. Figure 1 shows the device installed upon an automobile's internal combustion engine. Figure 2 shows the device in cross-sectional elevation taken on plane 22 of Figure 1.

In the invention "A" is the cross section through the middle of the exhaust manifold.

"B" is the inlet manifold.

"C" is the hot spot forming a common wall between the inlet manifold and exhaust manifold.

"D" is the valve controlling the heat to the exhaust manifold, as shown in Petit Patent #1,818,270.

"E" is the lever controlling valve "D".

"F" is a thermostat mounted on the outside of "A" immediately below inlet manifold "B".

"G" is the pin that anchors the center of thermostat, pin "G" being mounted on bracket "H" extending from exhaust manifold "A". The other end of thermostat "F" is connected by link "J" with lever "K" which is anchored at "L" to inlet manifold "B". This link "J" is operatively connected with the lever "E" and also with the valve "M".

The valve "M" controls the flow of air through the passage "N" which communicates with air entrance "O" of the carburetor. "P" is the outlet from the passage "N" delivering into the mixture outlet, which mixture outlet is controlled by throttle valve "R". Fuel nozzle "S" supplies fuel to mixing chamber "T". This fuel nozzle "S" is fed from an air vented fuel well "S1" through a fuel restrictor "S2" which communicates with the constant level fuel reservoir "V". This particular detail of this arrangement, however, is no part of the invention and the disclosure therefore is merely diagrammatic.

The priming means comprise another air vented auxiliary reservoir "U1" having a restricted fuel entrance "U2", which is supplied by float chamber "V" which also supplies the fuel nozzle "S". A fuel nozzle "U" discharges into the air passage "N" and thus forms the rich priming mixture required to start the engine.

In ordinary operation the engine is cold when starting and heat is directed against the hot spot "C". As this hot spot heats up, the thermostat "F" expands, moves lever "K", and therefore valve "M" cuts off communicating with passage "N" and mixture outlet "P". Meanwhile fuel is supplied to the mixing chamber "T" by means of orthodox nozzle construction "S". It follows therefore that fuel delivered from "U" is used only during the actual starting operation of the engine.

After the passage "N" is cut off by the valve "M" from communicating with "P" the valve "D" is moved sufficiently so that it begins to by-pass some of the exhaust gases away from hot spot "C", as described in Petit patent mentioned above (#1,818,270).

Finally, when the temperature of the thermostat rises to a sufficiently high degree, valve "D" closes, and the engine operates with the minimum amount of heat. When the engine stands and becomes cold, the thermostat reverses the above operation and opens the passage "N" to the mixture outlet and places valve "D" in position shown in drawings so that carburetor and heat controls are again in position for starting.

It will be noted that the thermostat "F" is located on the outside of that portion of the exhaust manifold which becomes a dead gas space when the valve "D" rotates 90° in clockwise direction. Hence, the moment the mixture temperature drops the thermostat moves the exhaust control valve into a position to readmit exhaust gas against the hot spot.

In Figure 1, 11 indicates the engine, and 10 the exhaust outlet.

What I claim is:

1. Automatic starting means for an internal combustion engine comprising an exhaust manifold, an exhaust heated inlet manifold, a thermostatic valve controlling the exhaust heat to said inlet manifold, a carburetor having a throttle controlled mixture outlet and a constant level fuel reservoir, an air vented well fed therefrom, an outlet from said well discharging into a conduit, said conduit communicating with the atmosphere and leading to the mixture outlet on the engine side of said throttle, a valve controlling the flow through said conduit, thermostatic means responsive to the temperature of said engine for controlling said valve so as to close said conduit shortly after the engine commences to fire.

2. The combination of an exhaust manifold, an exhaust heated inlet manifold, a common wall therebetween, a pocket in said exhaust manifold, a movable partition adapted to direct exhaust gases into said pocket against said common wall, in one position, and to protect said wall against said exhaust gases in another position, thermostatic means located on the outside of said pocket and responsive to the temperature thereof, a carburetor mounted on said inlet manifold and adapted to direct a normal explosive mixture against said hot spot, a primer associated with said carburetor and adapted to admit a rich mixture in addition to the normal mixture against said common wall, a valve controlling the said primer, said valve being operated by said thermostat whereby the rich mixture from the primer is first cut off and then the heating effect of the exhaust gases reduced and finally eliminated as the engine warms up.

3. Automatic starting means for an internal combustion engine comprising an exhaust manifold, an exhaust heated inlet manifold, a thermostatic valve controlling the exhaust heat to said inlet manifold, a carburetor having a throttle controlled mixture outlet and a constant level fuel reservoir, a fuel nozzle fed therefrom, a conduit into which said fuel nozzle discharges, said conduit communicating with the atmosphere and leading to the mixture outlet on the engine side of said throttle, a valve controlling the flow through said conduit, thermostatic means responsive to the temperature of said engine for controlling said valve so as to close said conduit shortly after the engine commences to fire.

GEORGE M. HOLLEY.